Figure 1:
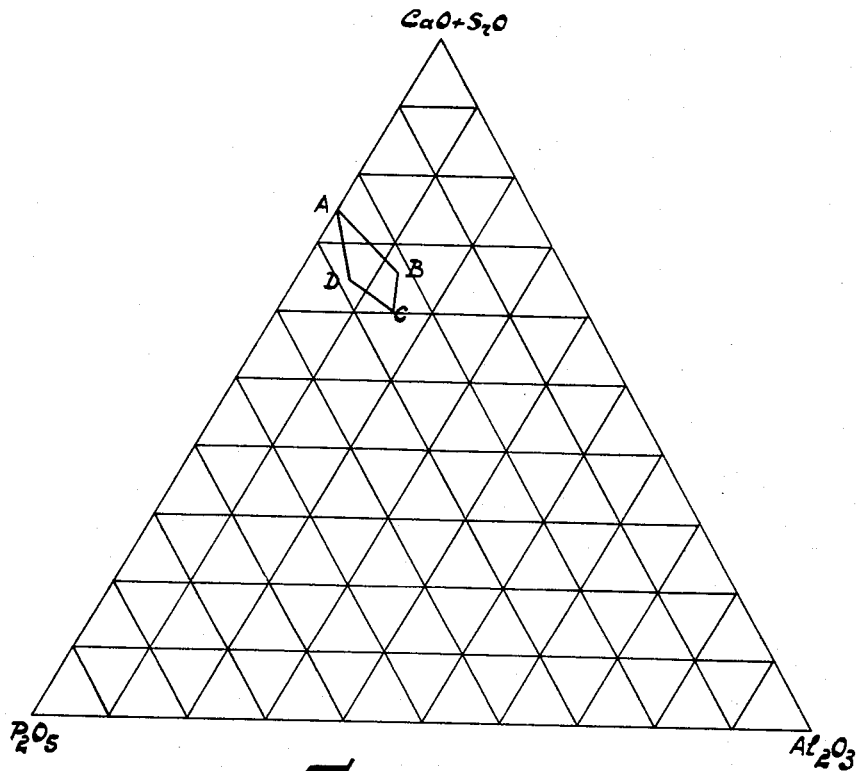

INVENTORS
Ferdinand Anne Kröger
Jan van den Boomgaard
BY
AGENT

United States Patent Office 2,750,344
Patented June 12, 1956

2,750,344

LUMINESCENT MATERIAL

Ferdinand Anne Kröger and Jan van den Boomgaard, Eindhoven, Netherlands, assignors to Hartford National Bank and Trust Company, Hartford, Conn., trustee Application November 23, 1951, Serial No. 257,745

Claims priority, application Netherlands, January 6, 1951

4 Claims. (Cl. 252—301.4)

This invention relates to cerium- and manganese-activated luminescent phosphates.

Luminescent materials have been proposed of the formula $(Ca+Sr)_3(PO_4)_2:Ce+Mn$. Excited by radiation of a wavelength below 3500 A., these materials give a red luminescence. It has been found that these materials also luminesce at higher temperatures, so that they may be used in cases in which they are exposed to such high temperatures, one of the most interesting uses being the high pressure mercury vapour discharge lamp.

However, the aforesaid materials have several limitations, one of the most serious being easy oxidation and consequent diminution of the luminous output. Another limitation is that the aforesaid formula is required to be accurately complied with, since otherwise two or more phases arise simultaneously i. e. the desired phase and non-luminescing or differently luminescing phases. Consequently the formula regarding the weight ratios must be accurately followed during manufacture to obtain solely the orthophosphate.

The aforesaid limitations are largely met when using luminescent material according to the invention.

According to the invention a luminescent material which consists of a cerium- and manganese-activated crystallised reaction product obtained by heating and containing aluminium, oxygen, phosphorus and at least one of the elements of the group consisting of calcium and strontium is characterized in that said elements are present in such proportions that the material (a) homogeneously has the same structure as $\beta$-calcium-orthophosphate, (b) may be represented symbolically by a point located within a quadrangular mixing crystal domain ABCD in the ternary system $(CaO+SrO)-P_2O_5-Al_2O_3$ bounded by the lines AB, BC, CD, and DA, the mol. ratios of the oxides $(CaO+SrO)P_2O_5$ and $Al_2O_3$ at the corners A, B, C and D being A. 3:1:0
B. 40:13:7
C. 86:36:21
D. 96:42:10 respectively.

The term $\beta$-phase of the calcium orthophosphate is to be understood to mean the low-temperature modification.

Excited by radiation of a wave length of 2537 A., materials according to the invention exhibit, beside a faint longwave ultra-violet or dark blue emission band, a strong emission-band in the red part of the spectrum, the latter being largely preponderant. Consequently, this emission is approximately equal to that of known materials without aluminium oxide. Since, however, as stated above, the chemical stability of materials according to the invention exceeds that of the conventional phosphates, they are inter alia more appropriate for use in high-pressure mercury vapour discharge lamps.

Due to the addition of aluminium oxide, the red emission band has a maximum at a wave length slightly shorter than that of the red emission band of the conventional materials without aluminium oxide, with the result that the lumen value is higher.

The maximum emission of a material according to the invention, which contains calcium without strontium is at approximately 6450 A., materials containing both calcium and strontium having a maximum red emission between 6450 and 6130 A.

The colour of the radiation is only slightly influenced by the total quantity of manganese and cerium. Also, the exact ratio of the quantities of manganese and cerium is unimportant. Excellent luminous outputs are obtained by using equal quantities of cerium and manganese, preferably between 2 and 4 mol. percent.

In the opening claim of British patent specification 512,154 a considerable number of luminescent materials are summarised in a wording which states that the luminescent material consists of a matrix M—P, where M represents any of the metals lithium, sodium, potassium, rubidium, ceasium, neryllium, magnesium, zinc, cadmium, calcium, strontium, barium, aluminium or lanthanum or a mixture of two or more of these metals, and P a group of borates, a group of phosphates or a mixture thereof. These materials are activated by at least 3% of a material of the composition A—P, where A is any one of the metals silver, thallium, tin, lead, cerium or antimony or a mixture of two or more of these metals. Out of the very large group of materials included in this wording, only a very small number is clearly described in the patent specification, it being stated that particular effects are obtained with the use of manganese as a second activator. Among the materials containing two activators calcium phosphate with cerium and manganese are inter alia mentioned, which is said to give a red luminescence upon excitation by means of a mercury vapour lamp.

British patent specification 512,154 does not mention anything about materials containing more than one metal of group M, so that in this patent specification no mention is found of the properties of phosphates containing strontium and aluminium in addition to calcium. Furthermore, no rules are given how to derive these properties with different compositions. Consequently it is very surprising to find in the ternary system $$(CaO+SrO)-P_2O_5-Al_2O_3$$

a domain wherein a homogeneous phase exists, and furthermore it was not obvious that the emission of materials within this mixed crystal domain exhibits substantially the same bands as a material without aluminium. Nor does said British patent specification mention anything about chemical stability.

To give a clear idea of the mixed crystal domain, it is indicated in Fig. 1 by the quadrangle ABCD in the ternary system $(CaO+SrO)-P_2O_5-Al_2O_3$.

Figure 2:
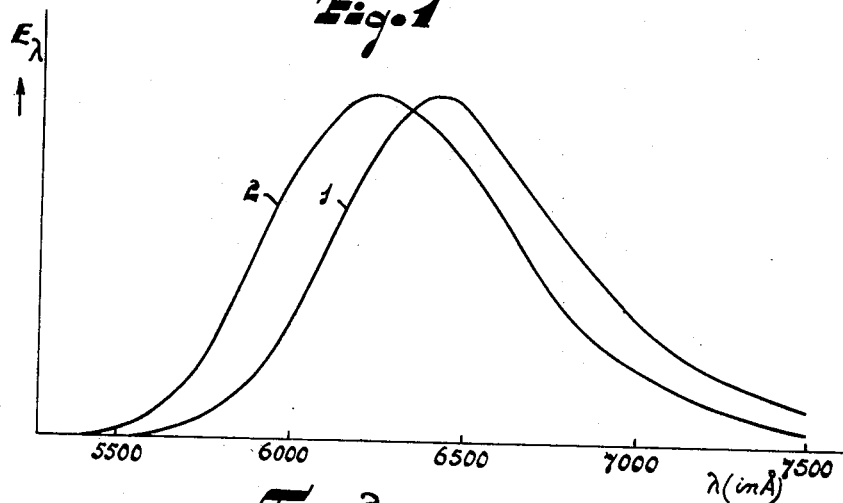

Fig. 2 shows a number of emission curves of materials described in the examples below and excited by a wave length of 2537 A.

Since the materials of the two examples below can be produced in completely the same manner, first of all a summary will be given of the emission materials for producing them, followed by a description of the method according to which luminescent materials are made from these initial materials.

Examples (a) 97.09 gr. $CaCO_3$
105.04 gr. $Al(NO_3)_3 9H_2O$
108.37 gr. $(NH_4)_2HPO_4$
22.02 gr. $Ce_2(CO_3)_3 5H_2O$
3.45 gr. $MnCO_3$ (b) 48.58 gr. $CaCO_3$
71.52 gr. $SrCO_3$
105.01 gr. $Al(NO_3)_3 9H_2O$
108.37 gr. $(NH_4)_2HPO_4$
3.45 gr. $MnCO_3$
22.03 gr. $Ce_2(CO_3)_3 5H_2O$ The aforesaid initial materials are jointly introduced into a beaker, mixed with water to form a mass which can easily be stirred and thoroughly mixed. The suspension thus obtained is vaporised to dryness until the dry material no longer smells of ammonia. Subsequently, the dry material is ground and heated in air at a temperature of 500 to 600° C. for approximately one hour. The product thus obtained is reground and reheated at a temperature of approximately 1200° C. in a mixture of hydrogen and nitrogen gas which is moistened, for example, by passing it through a washing bottle containing water.

In Fig. 2, the emission curves of the materials mentioned in the examples are designated 1 and 2 and belong to the Examples $a$ and $b$ respectively.

Although in the foregoing excitation with 2537 A. has been mentioned throughout this does not mean that the materials can be excited only by this radiation, they also emit light by the action of radiation of different wave lengths of the ultra-violet part of the spectrum. Excitation with electrons or other corpuscular particles is also possible, hence the materials according to the invention may be used in electric discharge tubes comprising a luminescent screen, wherein radiation is produced or which comprise a source of electrons or other corpuscular particles.

If desired, the materials according to the invention in a luminescent screen may be mixed with other luminescent materials either having the same or a different emission.

What we claim is:

1. A chemically stable luminescent material consisting essentially of a crystalline ternary composition having a homogeneous phase containing aluminum and represented by a point located within a quadrilateral ABCD in the ternary diagram of the system $$(CaO+SrO)—P_2O_5—Al_2O_3$$

the mol ratios of the oxides $(CaO+SrO)$, $P_2O_5$ and $Al_2O_3$ at the corners A, B, C, and D of the quadrilateral being, respectively:

A. 3:1:0
B. 40:13:7
C. 86:36:21
D. 96:42:10 said composition having the same crystal structure as $\beta$-calcium-ortho-phosphate, said composition being activated by cerium and manganese.

2. A luminescent material as claimed in claim 1 in which the quantity of cerium is 2 to 4 mol. percent.

3. A luminescent material as claimed in claim 1 in which the quantity of manganese is 2 to 4 mol. percent.

4. A luminescent material as claimed in claim 1 in which the quantity of cerium is equal to the quantity of manganese.

References Cited in the file of this patent

UNITED STATES PATENTS

| | | |
|---|---|---|
| 2,575,754 | Froelich | Nov. 20, 1951 |

FOREIGN PATENTS

| | | |
|---|---|---|
| 512,154 | Great Britain | Aug. 30, 1939 |
| 609,711 | Great Britain | Oct. 6, 1948 |

OTHER REFERENCES

Journal of the Electrochemical Society, October 1951, vol. 98, No. 10, pages 400–405.